United States Patent [19]
Levine et al.

[11] 3,892,652
[45] July 1, 1975

[54] APPARATUS FOR pH MEASUREMENTS

[75] Inventors: Stuart A. Levine, Westwood; Robert S. Potts, South Natick, both of Mass.

[73] Assignee: Corning Glass Works, Corning, N.Y.

[22] Filed: Oct. 7, 1974

[21] Appl. No.: 512,203

Related U.S. Application Data

[62] Division of Ser. No. 408,301, Oct. 23, 1973, abandoned.

[52] U.S. Cl. ............................ 204/195 R; 324/30 R
[51] Int. Cl. ............................................. G01n 27/28
[58] Field of Search ........ 204/195 R, 195 G, 195 F, 204/1 T; 324/30 R, 30 C

[56] References Cited
UNITED STATES PATENTS

| | | | |
|---|---|---|---|
| 2,608,596 | 8/1952 | White | 136/166 |
| 3,440,525 | 4/1969 | Cardeiro | 324/30 |
| 3,578,506 | 5/1971 | Chassoux | 136/168 |

OTHER PUBLICATIONS
Electrical Manufacturing, p. 340, Apr. 1953.

Primary Examiner—G. L. Kaplan
Attorney, Agent, or Firm—James A. Giblin; Clinton S. Janes, Jr.; Clarence R. Patty, Jr.

[57] ABSTRACT

Electrolyte container for saturated potassium chloride solutions used as an electrolytic bridge between sensitive portions of a flow-through pH electrode and a pH reference electrode. The container inhibits so-called "KCl creep" from the solution and consists of an essentially closed polymeric container having means which define separate orifices through which sensitive portions of the electrodes can be inserted for electrical contact with the solution, the orifice defining means also serving to retain the housings of the electrodes in a sealing relationship to the solution. Preferably, the orifice defining means and electrode retention means consist of resilient silicone electrode retaining rings or sealing glands which form a portion of at least one wall of the container which is preferably made from a transparent cast acrylic resin.

4 Claims, 4 Drawing Figures

APPARATUS FOR PH MEASUREMENTS

This is a division of application Ser. No. 408,301 filed Oct. 23, 1973, now abandoned.

BACKGROUND OF THE INVENTION

This invention is concerned generally with containers for electrolytic solutions and specifically with a container for saturated potassium chloride solutions which are commonly used as an electrolytic salt bridge between a flow-through pH electrode and a pH reference electrode.

It is well known that the pH of a solution can be measured in a variety of ways and with a variety of instruments some of which are commonly referred to as pH electrodes. One such type of electrode has become known as a "flow-through" pH electrode, an example of which is described in U.S. Pat. No. 3,357,910, issued to Schiller. Such flow-through pH electrodes consist, very simply, of an elongated capillary tube of hydrogen ion "sensitive" glass about which is a fused electrolyte cladding, generally containing a coiled wire lead which is embedded within the cladding.

To use such a flow-through pH electrode, a solution, the pH of which is to be measured, is drawn or injected into the hydrogen ion sensitive glass capillary tube to substantially fill at least that portion of the capillary which is clad with the fused electrolyte containing the wound wire lead and that portion of the capillary designed to be immersed in an electrolyte solution. The wire lead is connected to one terminal of an electrometer. A lead from a standard pH reference electrode is connected to the other terminal of the electrometer. An electrical circuit is then completed by immersing a sensitive portion of the reference electrode and one end of the filled pH electrode capillary tube into an electrolytic salt bridge such as a saturated potassium chloride solution. Since hydrogen ion activity of the solution within the capillary can be "sensed" through the hydrogen ion sensitive glass forming the capillary, and since ionic activity can be related to ionic concentration, the potential reading on the electrometer can be readily related to the pH of the solution by known means.

A major advantage in using a flow-through pH electrode is that relatively small samples of precious fluids (e.g. blood) can be used for pH measurements and those measurements can be made under essentially anaerobic conditions. Further, fluids such as blood can be readily thermostated to body temperature within the electrode by providing conventional thermostatting means (e.g. a water bath or electrical thermistors to thermostat the capillary contents).

In using flow-through pH electrodes and pH reference electrodes, a saturated KCl solution is often used as the electrolytic salt bridge between the sensitive portions of both electrodes. As used herein, the expression, "sensitive portions" of the electrodes, or the equivalent, is used in a fairly loose sense, referring specifically to those portions of the electrodes which are immersed in an electrolytic salt bridge solution so as to provide a complete electrical circuit between both terminals of the electrometer and through the reference electrode, the salt bridge solution, the solution of which the pH is to be measured, and the walls of the hydrogen ion sensitive glass forming the capillary containing the solution.

When saturated KCl solutions are used to form a salt bridge, they are commonly contained in an open-beaker such as a 50 ml glass beaker. The sensitive portions of the flow-through pH electrode and the pH reference electrode are immersed into the solution contained in the open glass beaker and the immersed electrodes are commonly held in place above the solution by clamp-like devices extending from a ring-stand type support.

When saturated KCl solutions are contained in such beakers, however, there occurs a phenomenon commonly referred to as "KCl creep." KCl creep describes a movement or growth of KCl crystals up the sides of a beaker containing a saturated KCl solution. With time, the creep can go over the edge and even down the outside of the beaker, resulting in an unsightly mess and a potentially damaging environment for any laboratory parts or instruments in the vicinity of the beaker. The KCl creep requires frequent replenishing of the saturated KCl solution and frequent cleaning of all parts on which the KCl crystals have grown.

KCl creep, even though very undesirable, has long been accepted as a necessary inconvenience associated with saturated KCl solutions used as a salt bridge for flow-through pH electrodes and pH reference electrodes. The KCl creep has been tolerated because such a solution must be readily accessible to the sensing portions of those electrodes which must be removed very often for maintenance or, in the case of the flow-through pH electrode, for filling and cleaning. Thus, because of the known utility of using saturated KCl solutions as salt bridges for the above electrodes, and because of the requirements for ready accessibility to the solution, open glass beakers have been commonly used to contain the solution and KCl creep has come to be accepted as inconvenient but unavoidable.

Quite surprisingly, we have now found that the disadvantages associated with KCl creep can be readily avoided with a relatively simple yet novel container for the saturated KCl solution. The construction of such a container is described more fully hereunder.

SUMMARY OF THE INVENTION

Our container which inhibits KCl creep from a saturated KCl solution used as an electrolytic salt bridge between the sensitive portions of a flow-through pH electrode and a pH reference electrode comprises an essentially closed plastic container which can be made from a variety of polymeric substances. The container has means defining separate orifices through which the sensitive portions of the electrodes can be inserted for electrical contact with the saturated KCl solution within the container. The container also has means for retaining the housings of the electrodes in a sealing relationship to the solution once the sensitive portions of the electrodes are inserted through the orifices. In a preferred embodiment, the container consists of a cast acrylic resin which is essentially transparent and the means for defining the orifices through which the sensitive portions of the electrodes are inserted and which retain the electrodes in electrical contact with, and sealing relationship to, the solution, consists of resilient silicone electrode retaining rings or sealing glands which are in pressure contact with, and form a portion of, at least one wall of the container.

SPECIFIC EMBODIMENTS

The flow-through pH electrodes and pH reference electrodes which may be used with the container of this invention are well known and are available in a variety of configurations. Such electrodes commonly have housings of a glass or polymeric material. The housings are generally elongated cylinders having a diameter of about one-half inch although the physical dimensions may vary depending on the actual models of such electrodes and/or their intended applications. As pointed out above, the actual construction of a representative flow-through pH electrode is described fully in U.S. Pat. No. 3,357,910, issued to Schiller. Further descriptions of such electrodes can be found in a Catalog (SI-20) entitled Scientific Instruments, dated Mar., 1973 and published by Corning Glass Works, Scientific Instruments, Medfield, Mass. 02052. The pH reference electrodes are also well known and some are described in the above catalog.

In use, electrical leads emerging from each electrode are connected to a conventional pH meter which indicates the pH of the test solution contained within the capillary of the flow through pH electrode. The sensitive portions or tips of the electrodes are commonly immersed to a depth of about one-half inch below the surface of the saturated KCl solution to assure completion of an electrical circuit.

In the case of the flow-through pH electrodes, the lower capillary tip is immersed to assure electrical continuity of the saturated KCl solution and the contents within the capillary. The contents of the capillary can be either drawn in through the lower end of the capillary using a conventional persistaltic pump in communication with the opposite end of the capillary, or the contents can be injected into the capillary (e.g. into the top end of the capillary) using, for example, a syringe. The above general descriptions of the electrodes are given as background information to illustrate the essense of the invention being claimed.

Figure 1:
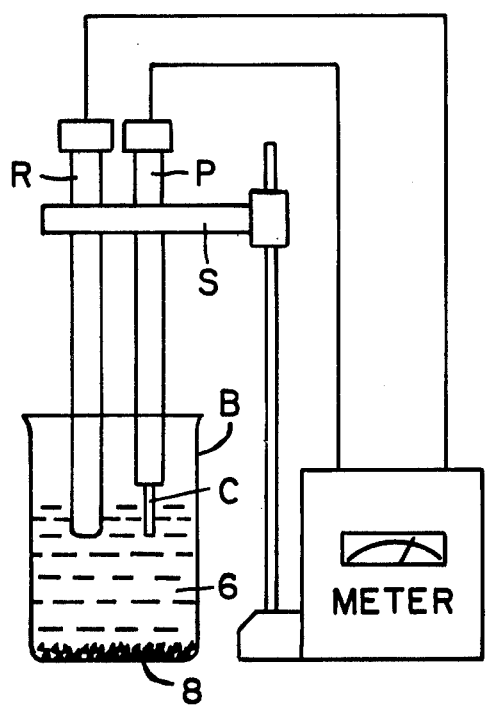
FIG. 1 (PRIOR ART) illustrates a typical prior art flow-through pH electrode measuring system.
Figure 2:
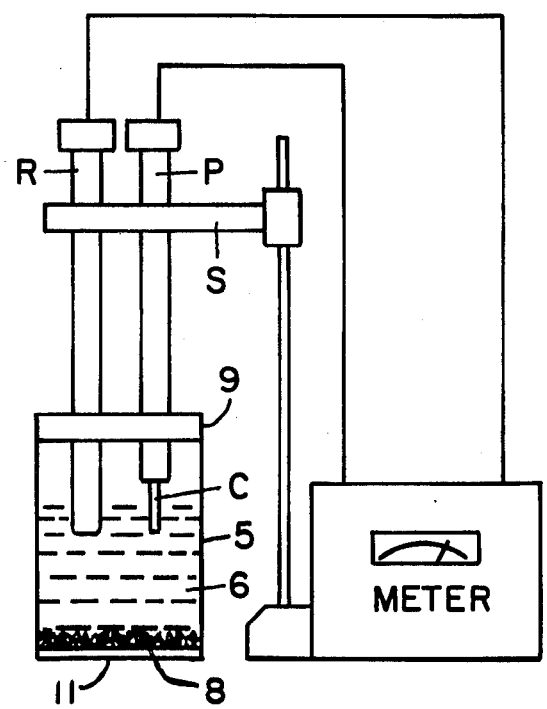
FIG. 2 illustrates such a system utilizing the container of this invention.
Figure 3:
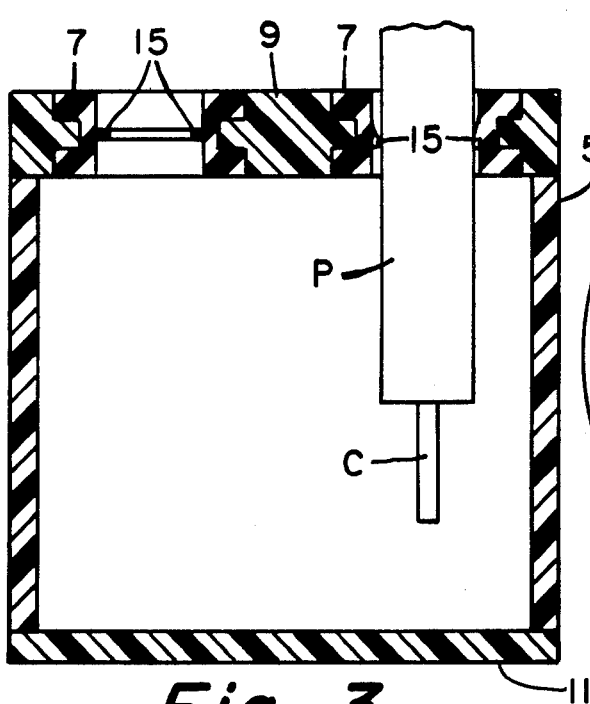
FIG. 3 is a cross sectional view of the container shown generally in FIG. 2.
Figure 4:
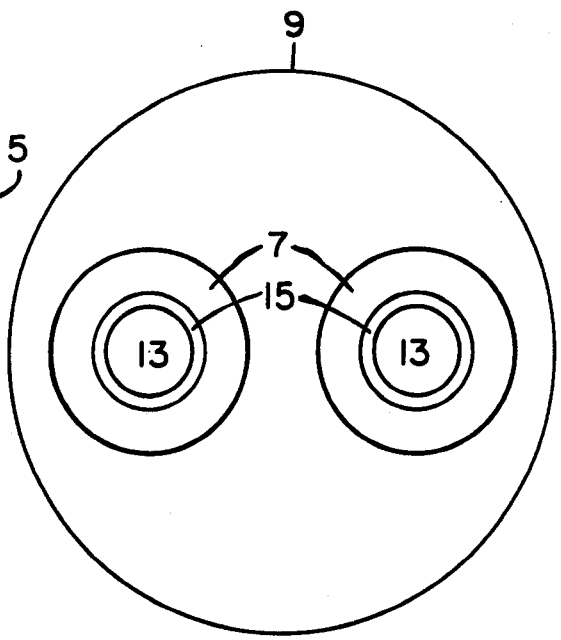
FIG. 4 is a top view of a complete container as would be seen in a non-cross section of FIG. 3 looking down on the full top portion of FIG. 3.

The invention is generally illustrated in FIGS. 2, 3, and 4. The PRIOR ART Figure (FIG. 1) shows a conventional flow-through pH electrode measuring system. The system consists, very basically, of a conventional reference electrode R and a flow-through pH electrode P supported by a support means S (e.g. a clamping extension from a ring stand). The sensitive portions of the electrodes are immersed in an electrolytic solution of saturated KCl solution 6 contained in a beaker B. Visible KCl crystals 8 at the bottom of beaker B assure that the solution 6 is saturated. The electrodes have leads electrically connected to a conventional pH meter designated as "METER" in the PRIOR ART FIG. In use, the sensitive portions of both electrodes are immersed in a saturated KCl solution contained in an open glass beaker B. The capillary portion of the pH electrode P is designated as C in the Figure. As pointed out above, the use of such an open container leads to KCl creep up the inside surface of the glass beaker and even over the top edge and down the outer sides. In time, the KCl crystals may even creep all the way down the beaker and tend to "cement" it to a table top, creating an unsightly mess and fouling of any materials near the beaker. Also, KCl creep onto the table top can ultimately cause electrical leakage to the chassis ground of the meter.

FIG. 2 illustrates the use of the container of the present invention, detailed illustrations of which are shown more clearly in FIGS. 3 and 4. In FIG. 2, it can be seen that the saturated KCl solution, in container 5, is sealed from contact with the air by the electrodes held in place by an upper end portion 9 which has sealing glands (not shown in FIG. 2) but shown in FIGS. 3 and 4 as sealing glands 7.

FIG. 3 is an illustration of a vertical cross-section of the container 5 of FIG. 2 showing the relationship of the sealing glands 7 to the overall container 5. In a preferred embodiment, the container 5 consists of an essentially cylindrical piece of cast acrylic polymer resin having two cast acrylic end portions 9 and 11 which are sealed to the cylindrical portion by conventional means (e.g. solvent welded, ultrasonically welded, molding, etc.). The end portion designated 9 in FIGS. 2, 3, and 4 has two orifices into which sealing glands 7 are insertable. The sealing glands 7 are made of a resilient material such as a polymeric silicone material known as Silastic[R] silicone polymer. The configuration of the sealing glands 7 is such that, when in place in end portion 9, they sealably conform to the orifices of end portion 9 and defines further orifices 13 through which sensitive portions of the electrodes are inserted and by which the electrode housings are retained. The diameter of orifices 13 is about equal to or slightly smaller than the diameters of the electrode housings insertable therethrough. Very preferably, orifices 13 are further defined by resilient silicone flanges 15 forming inner portions of sealing glands 7 and designed to pressure seal the housings of the electrodes inserted therethrough such that the electrodes are not only retained by the overall sealing glands 7, but also, when in place, the silicone flanges 15 further seal the saturated KCl solution from contact with air outside of the container. It is essential that the sealing glands 7 consist of a resilient material such as a silicone material so as to accept the wide tolerances of the cylindrical glass housings found in many electrodes. For example, the very nature of glass manufacturing techniques limits to some extent a very tight control over the outside diameter of glass electrode housings. Thus, in a very preferred embodiment, the sealing glands 7 define electrode receiving orifices 13 which are slightly smaller (e.g. about one-eighth inch) in diameter than the largest outside housing diameter found in the reference electrodes and flow-through pH electrodes used with the container.

FIG. 4 illustrates a full top view of the container which is illustrated in cross section in FIG. 2. In FIG. 4, the medially extending flange portions 15 of the sealing glands 7 can be seen in more detail. The flange portions 15 form an integral portion of the overall sealing glands 7.

Because glass surface may tend to act as a nucleating site for crystals of a saturated KCl solution, it has been found that the container should be made of a polymeric material. Preferably the material is essentially transparent, or at least transluscent so that the contents can be clearly seen from the outside. It is important that the KCl solution level by viewable from the outside so that, if ultimately necessary, the solution can be replenished and that electrical contact of the electrodes with the solution can be ascertained after electrode insertion.

The main requirements for the polymeric material forming the major portion of the container are that it be essentially non-conductive and chemically non-reactive with the saturated KCl solution. Preferably, the material forming the container is easy to work with and the container can be easily fabricated therefrom. Although useful containers can be made from a number of polymeric materials such as polystyrene, polyethylene, polyvinylchloride, polycarbonate, and the like, a preferred polymeric material is cast acrylic resin because of its transparency and the ease with which it can be worked. That material was used to make the preferred container described below.

The preferred container, detailed portions of which are shown in FIGS. 3 and 4, and a full illustration of which is shown in FIG. 2 was made as follows: a transparent cylinder of cast acrylic resin was prepared by conventional resin casting techniques. The cylinder had a height of about 2 inches, an inner diameter of about 2¼ inches and an outer diameter of about 2½ inches. A one-eighth inch thick by 2½ inch disc of the same acrylic material was sealed (solvent welded) to one end of the cylinder. To the other end of the cylinder was sealed a thicker disc (e.g. about three-eighths inch) of the same material and same diameter. This disc had two orifices each adapted to receive a silicone sealing gland (see sealing glands 7 of FIG. 3) which is snapped in place and pressure held in sealing relationship to each orifice. In cross section the circular sealing glands have an H-shape with the recessed portions adapted to engage laterally extending flanges which define the circular orifices in the disc 9. The sealing glands also have two radially extending lip portions adapted to engage recessed portions of on opposite sides of the disc, the recessed portions being partially defined by the laterally extending flange of the disc which defines the orifices of the disc 9.

In an actually constructed container for a Corning Model 12 pH electrode and a Calomel reference electrode, the sealing glands were made from a resilient silicone material known as Silastic$^R$ polymeric material, and had an outer diameter of about three-fourths inch, an inner diameter of about one-half inch without considering the sealing gland flange 15 and an inner diameter of about three-eighths inch with the sealing gland flange 15. Conventional ½ inch diameter electrode housings can be readily inserted through the orifice defined by the inner sealing gland flanges 15 and the flanges assure that the electrodes, when inserted, seal the saturated KCl solution from air outside of the container.

In use, the sealing glands 7 tightly fit the orifices in the top portion (cast acrylic resin disc 9) of the container. Once in place, the appropriate electrodes can be readily pushed through the orifices defined by the sealing glands 7 and sealing gland flanges 15 and the electrodes themselves act as the final air sealing means for the solution. The use of such sealing glands permits the easy removal of either electrode for maintenance or filling since the electrodes are held in place only by pressure of the resilient sealing glands 7 against the electrode housings.

The above described container, with electrodes inserted therein, completely inhibited KCl creep when the container contained a saturated KCl solution. Inasmuch as the main functions of the sealing glands are to retain electrode housings inserted therethrough and to provide an air seal of the solution from the surrounding atmosphere once the electrodes are so retained, it can be appreciated that numerous configurations of sealing glands are possible provided they serve the above functions. Accordingly, it is intended that the above described container and sealing glands should be construed as merely illustrative of one preferred embodiment and that the present invention should be limited in scope only by the appended claims.

We claim:

1. In a pH measuring system comprising a flow-through pH electrode, a pH reference electrode, and a container containing a saturated KCl solution forming an electrolytic salt bridge between the sensing portions of each electrode, the improvement wherein said container for the saturated KCl solution, consists of a polymeric material having separate orifices through which the sensing portions of each electrode are insertable and the orifices having means adapted to retain the electrodes in electrical contact with KCl solution and adapted, with the retained electrodes, to seal the KCl solution from contact with air external to the container, thereby providing a means for inhibiting KCl creep from the saturated KCl solution.

2. The pH measuring system of claim 1 wherein the means adapted to retain the electrodes and, with the electrodes, seal the KCl solution from contact with air external to the container, consist of resilient silicone rubber electrode retaining rings in pressure contact with, and forming a portion of, at least one wall of the container.

3. The pH measuring system of claim 2 wherein the polymeric material is a cast acrylic polymer.

4. The pH measuring system of claim 3 wherein the container is essentially transparent.

* * * * *